No. 886,265. PATENTED APR. 28, 1908.
J. A. SPEED.
RAPID FIRE CARBURETER.
APPLICATION FILED APR. 25, 1907.
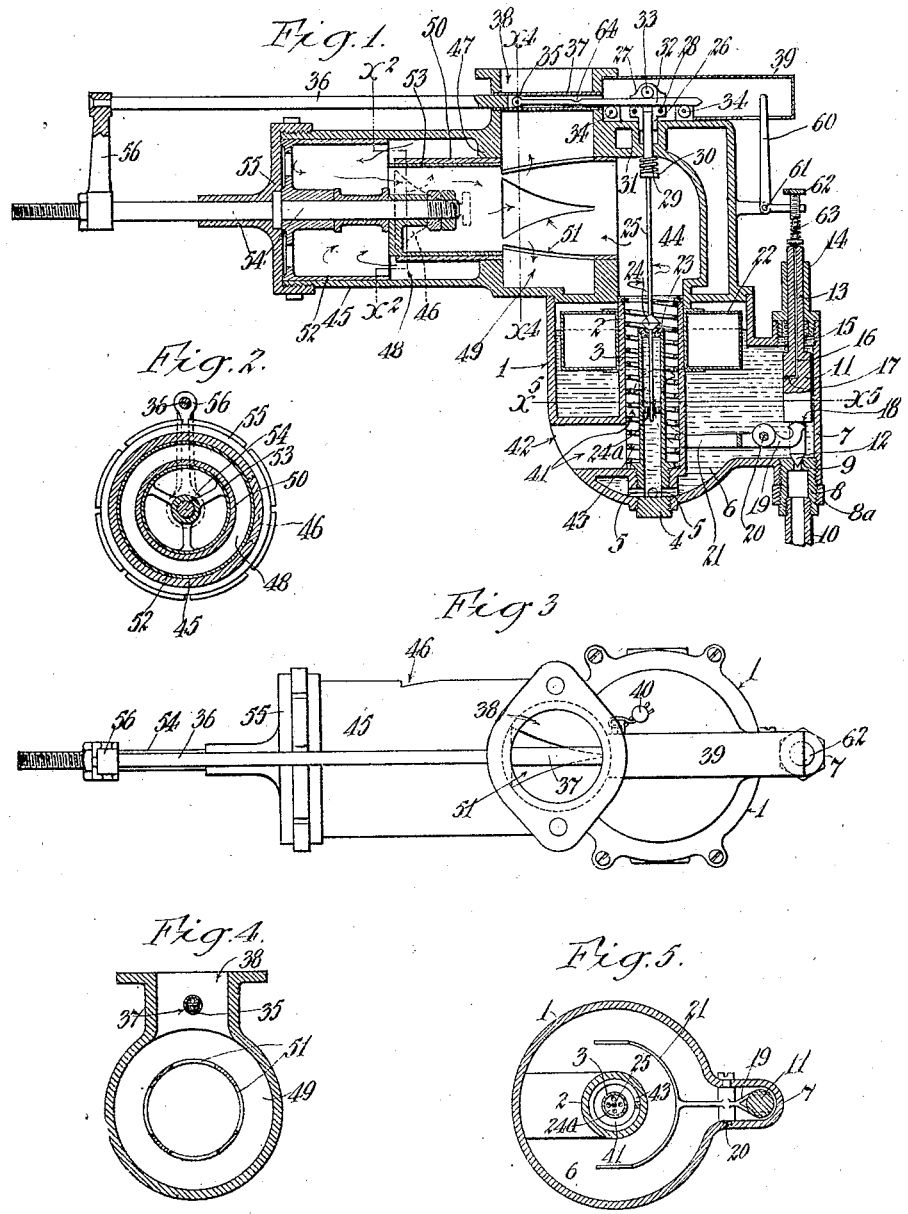
Witnesses:—
Inventor:
James A. Speed
by Townsend & Hackley & Knight
His Attys.

UNITED STATES PATENT OFFICE.

JAMES A. SPEED, OF LOS ANGELES, CALIFORNIA, ASSIGNOR TO SPEED MANUFACTURING COMPANY, OF LOS ANGELES, CALIFORNIA, A CORPORATION OF CALIFORNIA.

RAPID-FIRE CARBURETER.

No. 886,265.　　　　Specification of Letters Patent.　　　Patented April 28, 1908.

Application filed April 25, 1907. Serial No. 370,324.

*To all whom it may concern:*

Be it known that I, JAMES A. SPEED, a citizen of the United States, residing at Los Angeles, in the county of Los Angeles and State of California, have invented a new and useful Rapid-Fire Carbureter, of which the following is a specification.

This invention relates to carbureters and has for its object to provide a carbureter which will supply a mixture of the right proportion at any speed of the engine.

Another object is to provide a novel means for facilitating the vaporization of the gasolene or other liquid fuel employed.

Another object is to prevent accidental flooding of the carbureter.

Another object is to provide for securing extremely accurate regulation of the condenser, a further object being to effect the regulating movements by sliding elements instead of by revoluble parts.

Another object is to provide an auxiliary supply of air and to purify the same before it combines with the mixture.

Other objects relate to details of construction and arrangement which will be hereinafter set forth.

The accompanying drawings illustrate the invention, and referring thereto:—Figure 1 is a vertical cross section taken longitudinally through the carbureter. Fig. 2 is a vertical cross section on line $x^2$—$x^2$ Fig. 1. Fig. 3 is a plan view of the carbureter. Fig. 4 is a cross section on line $x^4$—$x^4$ Fig. 1. Fig. 5 is a horizontal cross section on line $x^5$—$x^5$ Fig. 1.

The carbureter comprises a float chamber 1, through the center of which extends a strangling tube 2. A gasolene nozzle 3 is arranged in the center of the strangling tube and the lower end of the nozzle 3 communicates with a hollow screw plug 4 which is provided with four radial orifices 5 which permit the gasolene to flow from the lower portion of chamber 6 into the lower end of the nozzle 3. A tubular casing 7 is arranged at one side of the float chamber and in the lower end thereof is screwed a nipple 8 in the upper end of which is formed a valve seat 9. Gasolene is admitted through a pipe 10 to the nipple 8. A lock nut $8^a$ holds the nipple in the position to which it may be adapted. A valve rod 11 is arranged in the chamber 7, the lower end of the valve rod having a conical valve 12 adapted to fit the seat 9, while the upper portion of the valve rod has an extension 13, of reduced diameter, which slides in a tubular extension 14. A coil compression spring 15 is arranged inside of the chamber 7 around the extension 13 and serves to depress the valve rod and close the valve. The valve rod is provided with a duct or vent 16 which extends from the upper end of the valve rod, as shown, to an off-set duct 17, the latter communicating with the space inside of the chamber 7. Near its lower end the valve rod has a shoulder 18 which rests upon a fork 19 which is pivoted at 20 in the chamber 7, there being a larger fork 21, as shown in Fig. 5, which is connected with the fork 19 and which lies in the float valve chamber and straddles the strangling tube 2.

Encircling the strangling tube 2 and resting on the fork 21 is a float 22. The gasolene enters through pipe 10 and flowing past the valve 12 enters the float chamber 6 and is maintained at about the level indicated. When the gasolene falls below this level, as the float drops, it depresses fork 21 and causes fork 19 to lift the valve 12, thus permitting more gasolene to enter the float chamber, and as the level of gasolene rises, the float in rising permits the valve 12 to be depressed by spring 15 and thus restrict the flow of gasolene. By loosening the lock nut $8^a$ the nipple 8 may be adjusted up or down to regulate the level of gasolene in the float chamber.

In the upper end of the nozzle 3 is a valve seat 23 which is adapted to be closed by a conical valve 24, the latter being carried on a valve stem 25, which projects down through the valve seat and into the nozzle 3, the lower end of stem 25 being slidably mounted in a guide $24^a$ formed in the nozzle 3. The upper end of the valve stem 25 is engaged by a split sleeve 26 which is formed with a split head 27, the two sections of which are clamped together by screws 28. A coil spring 29 is interposed between a flange 30 and the wall 31 which incloses a mixing chamber. The head 27 is provided with a transverse slot through which passes a wedge 32, the head 27 having a roller 33 which bears on the upper edge of the wedge 32, and the spring 29 serves to draw down the valve stem 25 and hold the roller 33 against the wedge 32, the latter being supported by a pair of rollers 34. The wedge 32 is pivoted at 35 to an operating rod 36. Part of the wedge 32 and adjacent end of rod 36 are housed in a tube 37 which bridges the discharge passage 38. A cap 39 is slidably arranged on the casting of the carbureter and when slid into place completely houses the wedge, the rollers and head 27, and prevents tampering of these parts. A seal 40, as shown in Fig. 3, may be provided which will prevent the withdrawal of the cap 39 without detection. This will enable the carbureters to be sent out from the factory properly assembled and sold under a guarantee, and will prevent unauthorized tampering with the adjustments, as the contract may be violated if upon bringing a carbureter back to the factory, for alleged, defects, the seal is not intact.

Air is admitted to the strangling tube 2 through an air passage 41, the casting having an orifice 42 for the admission of air to passage 41. From the passage 41 air enters the lower part of the strangling tube 2 in the annular space between the strangling tube and the nozzle 3, and as the air is sucked up through this annular space it is given a vortical or whirling motion by means of a coiled wire 43. This air from the strangling tube 2 enters the mixing chamber 44, and as the air passes through the upper part of the strangling tube the gasolene which is sucked up through the nozzle 3 is deflected by the conical valve 24 and mixed with the air in the strangling tube, the gasolene being broken up and partially vaporized by its impact with the valve 24 and by its deflection thereby, and the vaporization is further effected as this partially vaporized gasolene mixes with the air in the upper part of the strangling tube, the whirling movement of the air resulting, in a marked degree, in promoting the vaporization and mixture.

A horizontal cylinder 45 projects from the upper end of the carbureter and one side thereof is formed with a substantially triangular air inlet opening 46 having curved sides forming a graduated opening, partially shown in Fig. 3 and shown in dotted lines in Fig. 1. The cylinder 45 is divided by a partition 47 into two air chambers 48 and 49, the air opening 46 communicating with the chamber 48. A horizontal tube 50 extends through the partition 47, being arranged concentrically in the cylinder 45, and the right hand end of tube 50 communicates with the mixing chamber 44 and is provided with four substantially triangular openings 51 having curved edges forming graduated openings for the passage of mixture out of that part of the tube. The left hand portion of the tube 50 communicates with a chamber 48 through the end of the tube.

A cylindrical valve 52 is slidably arranged in the cylinder 45, while a smaller cylindrical valve 53 is slidably arranged in the tube 50, both valves 52 and 53 being carried by a valve rod 54 which extends through a cap 55 on the end of cylinder 45, and an arm 56 connects the valve rod 54 with the wedge operating rod 36. The valve rod 54 may be connected in any desired manner with a controlling device, not shown. The valve 53 regulates the area of the openings 51, while the valve 52 regulates the area of the opening 46, and in Fig. 1 the valves are shown in their extreme positions to the left in which openings 46 and 51 are open to their fullest extent. The mixture with its primary amount of air is drawn by suction of the engine from the mixing chamber 44 into the tube 50 and out through the openings 51 into the chamber 49 and thence through the openings 38 to the induction pipe of the engine.

The suction produced in chamber 49 also results in drawing in an auxiliary air supply through the opening 46 into the chamber 48 externally of the tube 50. This air passes to the left and into the interior of the valve shell 52, is deflected back, as indicated by the arrows, and enters the left end of valve 53 and passes entirely through the shell of valve 53, and in the right hand portion of tube 50 combines with the mixture which has entered from the other direction from mixing chamber 44. The total mixture thus combined passes out through the openings 51 into the chamber 49 and thence through passage 38 to the induction pipe of the engine.

By moving the valve rod 54 to the right, openings 46 and 51 may be partly closed, which will not only reduce the amount of suction in the carbureter but will also restrict the amount of air which enters through opening 46, and at the same time the wedge 37 moves a corresponding distance to the right and allows the spring 29 to expand and close the valve 24 a corresponding degree, thus reducing the amount of gasolene fed into the strangling tube. By entirely closing the valves 52 and 53 the wedge 37 will have been moved so far to the right that the valve 24 will have been completely closed by the expansion of spring 29.

A bell crank lever 60 is pivoted at 61 and its upper end is adapted to be operated by the end of the wedge 37. An adjusting screw 62, in the lower end of the bell crank lever 60, has a reduced end which carries a compression spring 63, and a pressure plate is carried on the lower end of the spring 63. When the wedge is moved to the extreme right, a notch 64 in the upper edge of the wedge comes under roller 33 and allows the head to drop free from restraint by the wedge which permits the valve 24 to sink naturally to its seat. At the same time the lever 60 compresses spring 63 and forces valve 12 to its seat. This insures absolute closure of both valves 12 and 24 and prevents flooding. Thus it will be seen that by adjusting the rod 54 the amount of gasolene which is vaporized may be varied and that at the same time the air supply is automatically regulated, so that at all times the proper ratio of vapor and air is maintained. The regulation of the valve 24 being accomplished by the sliding wedge 32, enables a very accurate adjustment of the valve to be made, and the wear of this adjusting device is practically *nil* by reason of the rollers 33 and 34 between which the wedge slides. The wear on valves 52 and 53 is also very slight by reason of their sliding movement.

What I claim is:—

1. In a carbureter, a strangling tube, means for spraying gasolene into the strangling tube comprising a nozzle in the tube, a valve at the upper end of the nozzle, an upper stem on said valve, a lower stem on said valve projecting into said nozzle, a guide in the nozzle in which the lower stem slides, means for admitting air to the strangling tube to combine with the spray of gasolene, auxiliary means for admitting a further supply of air to the mixture after it has left the strangling tube, and mechanism having an engagement with said upper valve stem and with said auxiliary means for simultaneously operating the auxiliary means and valve.

2. In a carbureter, a strangling tube, a gasolene nozzle concentric therewith, means for admitting gasolene to the lower portion of the nozzle, means for admitting air to the lower portion of the strangling tube, a valve at the upper end of the nozzle, a mixing chamber above the strangling tube, a stem on said valve projecting through the mixing chamber and having a head, and a wedge slidably engaging said head for adjusting the valve.

3. In a carbureter, a strangling tube, a gasolene nozzle concentric therewith, means for admitting gasolene to the lower portion of the nozzle, means for admitting air to the lower portion of the strangling tube, a valve at the upper end of the nozzle, a mixing chamber above the strangling tube, a stem on said valve projecting through the mixing chamber and having a head, a wedge slidably engaging said head for adjusting the valve, a roller carried by the head bearing against the upper edge of the wedge, rollers mounted above the mixing chamber and bearing against the lower edge of said wedge, and a spring bearing against a flange on the valve stem for closing the valve.

4. In a carbureter, vaporizing means, a horizontal cylinder having a partition, a tube in said partition, the cylinder having an air inlet at one side of the partition, said tube having mixture outlet openings on the other side of the partition, a cylindrical sliding valve in said tube for regulating the size of the latter openings, a larger cylindrical valve in the cylinder for regulating the air inlet opening, a valve rod for operating both valves, and a mixing chamber communicating with said vaporizing means and the adjacent open end of said tube.

5. In a carbureter, vaporizing means, a horizontal cylinder having a partition, a tube in said partition, the cylinder having an air inlet at one side of the partition, said tube having mixture outlet openings on the other side of the partition, a cylindrical sliding valve in said tube for regulating the size of the latter openings, a larger cylindrical valve in the cylinder for regulating the air inlet opening, a valve rod for operating both valves, a mixing chamber communicating with said vaporizing means and the adjacent open end of said tube, a valve for the vaporizing means, the valve having a stem which projects through the mixing chamber and having a head on its upper end, a wedge slidably engaging said head, an operating rod pivoted to one end of the wedge, and an arm connecting the operating rod with the first named valve rod.

6. In a carbureter, vaporizing means, a gasolene nozzle therefor, a valve for the nozzle, a wedge for operating said valve, a valve for controlling the admission of gasolene to the vaporizing means, a bell crank lever engaged by the end of said wedge, an adjusting screw in the bell crank lever, and spring means carried by the adjusting screw for pressing against the stem of the latter valve to close the same when the wedge is operated to close the former valve.

In testimony whereof, I have hereunto set my hand at Los Angeles, California this 18th day of April 1907.

JAMES A. SPEED.

In presence of—
GEORGE T. HACKLEY,
FRANK L. A. GRAHAM.